June 4, 1935. E. NAUJOKS 2,004,010
PROCESS OF PRODUCING PENTAERYTHRITE
Filed Aug. 29, 1932 2 Sheets-Sheet 2

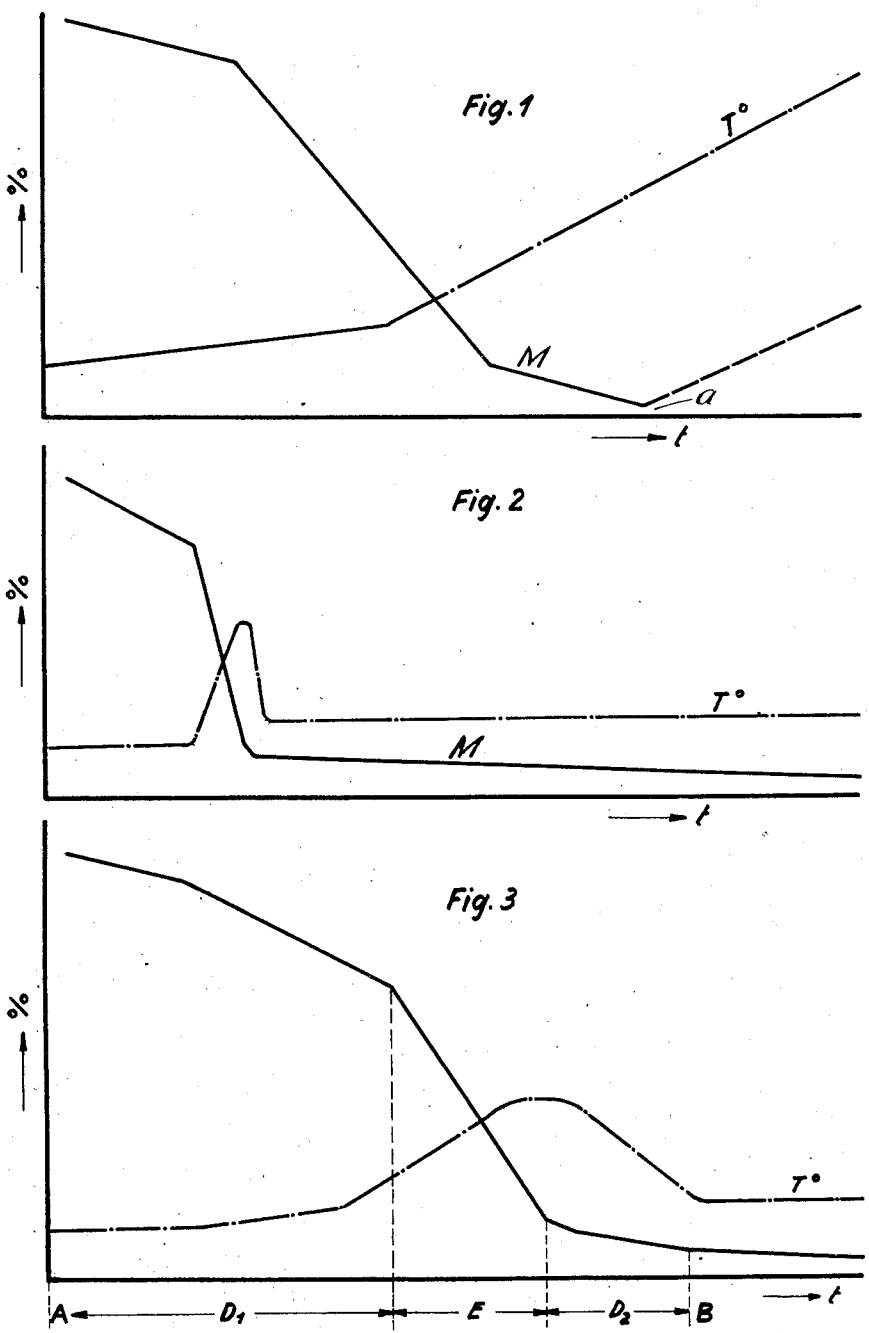

Inventor:
Erich Naujoks,
by C. F. Windroth
Att'y.

Patented June 4, 1935

2,004,010

UNITED STATES PATENT OFFICE 2,004,010

PROCESS OF PRODUCING PENTAERYTHRITE

Erich Naujoks, Constance, Germany, assignor to Deutsche Gold & Silber-Scheideanstalt vormals Roessler, Frankfort-on-the-Main, Germany, a company of Germany Application August 29, 1932, Serial No. 630,944
In Great Britain June 21, 1932

16 Claims. (Cl. 260—156.5)

The present invention relates to an improved method of producing pentaerythrite by the condensation of formaldehyde with acetaldehyde in the presence of an alkaline agent.

Acetaldehyde, formaldehyde and water combine to form pentaerythrite according to the following equation:

$$4H.COH + CH_3COH + MOH = C_5H_{12}O_4 + H.COOM,$$

in which MOH represents a base or the equivalent. This reaction has been investigated in the early experiments of Wigand and Tollens and in particular subsequent workers on this subject were successful in substantially shortening the time of the reaction and in producing yields of 70 per cent calculated on the formaldehyde employed.

Since formaldehyde is frequently employed in excess, for example in a molecular ratio of 5:1 calculated on the acetaldehyde, statements of yield reckoned on the acetaldehyde are liable to give results with higher molecular ratios which are too favourable and therefore deceptive. All statements of yield given below are calculated on the formaldehyde employed. Furthermore it has been recognized that it is advantageous to work at relatively lower temperatures, for example to maintain the temperature below 25° C. during the main reaction and also to carry out the completion of the condensation at temperatures up to, at most about 40 to 60° C. In spite of this, if all these temperature conditions are adopted, it does not ensure beyond doubt that the reaction will proceed favourably for the subsequent operation proceeds with quite fluctuating results, nor does the interruption of the reaction at definite times deduced from such working directions, in any way ensure uniform yields of the upper limits of 70 per cent. On the other hand, successive experiments give yields lying between 60 and 70 per cent which are very divergent, the majority of the results lying below 65 per cent.

This non-uniform course of the reaction is actually not so astonishing however, since as is known, a difference in temperature of 10° C. can produce from twice to three times the speed of reaction, that is to say, that variations in the temperature of reaction within a small range such as can not be avoided owing to the exothermic character of the reaction, may render the most precise statements of time extremely illusory, quite apart from the quite different concentrations of the condensation agent which occur in different cases in the end stage of the process depending upon the amount of the by-reactions.

It has now been found that, in spite of the unavoidable fluctuations in the temperature of reaction, and consequently in the course of the reaction as a whole, it is possible to control properly the course of the reaction and to determine the most favourable moment in each individual case for interrupting the reaction.

According to the present invention, the result is attained by continuously investigating the amount of materials to be reduced in the reaction liquid which can best be effected by titration with Fehling's solution and the condensation reaction is interrupted at or before the time at which the amount of material to be reduced in the reaction liquid reaches the minimum value.

In order that the invention may be more fully explained, reference will be made to the accompanying drawings, in which:

Fig. 1 is a diagram showing the reaction conditions when carried out in the manner previously adopted;

Fig. 2 is a similar diagram showing the same conditions in a reaction carried out according to the present invention;

Fig. 3 is a diagram similar to Figures 1 and 2 showing the conditions for a continuous process carried out in the apparatus shown in Fig. 4;

Figure 4:
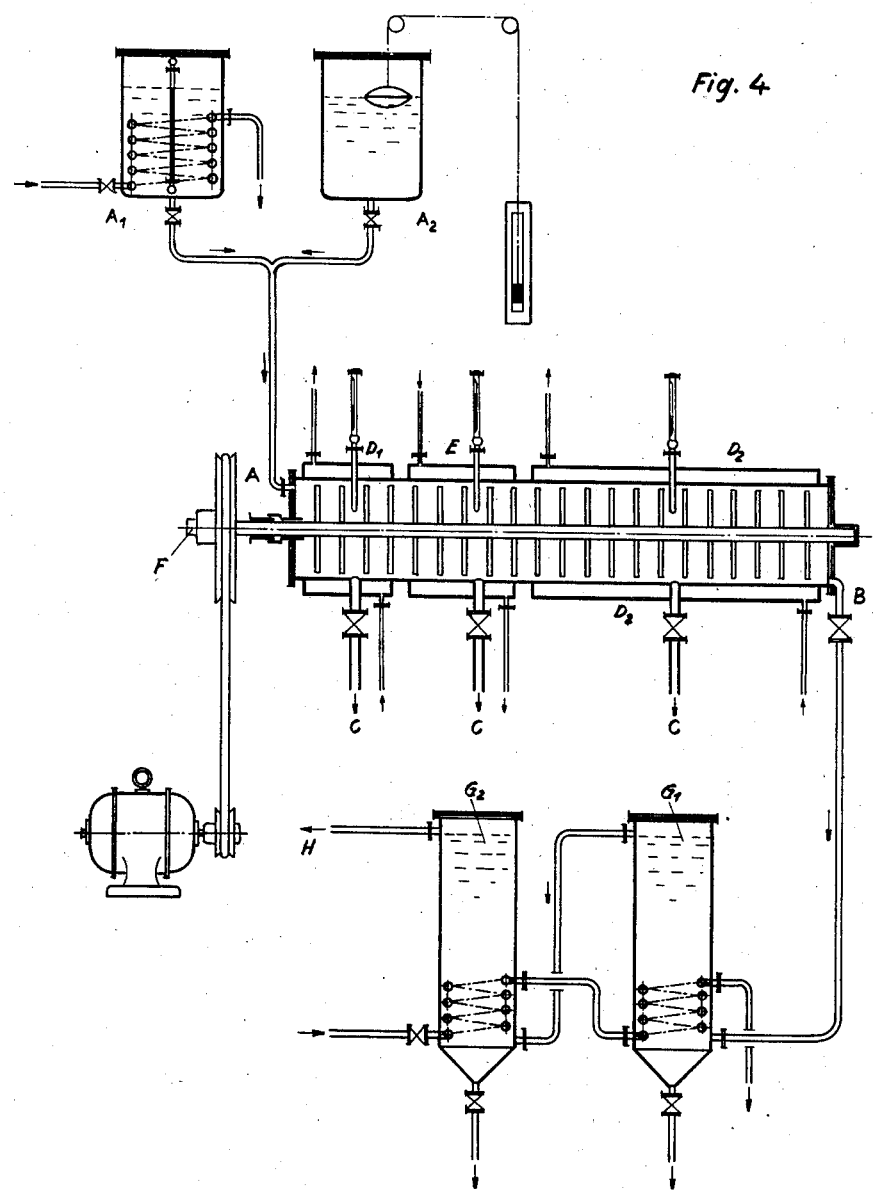
Fig. 4 is a diagrammatic side elevation of a plant for carrying out a continuous process according to the invention.

It has been found that the variation in the amount present of reducing substances during the reaction when carried out according to the directions hitherto recommended is represented approximately by the diagram shown in Figure 1. In curve M in Figure 1, the abscissæ represent time of the reaction and the ordinates the percentage present of reducing substances, while curve T shows the variation in temperature. It is seen from this that the amount of reducing substances decrease uniformly and after reaching the minimum at $a$, particularly if as is often recommended, temperatures of 40 to 60° C. are maintained in the final stage of the reaction again clearly rises in some circumstances to a value which amounts to a number of times the minimum value. By carrying out numerous experiments which were interrupted at different instants, it has been found that, relatively speaking, the best yields together with the greatest purity of the product are produced if the reaction is carried out at the lowest possible temperature, preferably below 35° C. and is interrupted not later than the time of attaining the minimum amount of reducing substances, but preferably slightly earlier, for example, while the reaction mixture is simultaneously cooled to temperatures not above 15° C. The alkaline condensation agent is thoroughly neutralized, or when quick lime is used of which there is still an excess present, it is removed by settling.

Some examples of methods of carrying out the reaction according to the invention will now be described.

*Example 1.*—A solution of 38 gms. of caustic soda in 300 gms. of water is allowed to flow into a mixture of 400 gms. of 30 per cent by weight formaldehyde and 44 gms. of acetaldehyde in the course of one and a half hours, with vigorous stirring, and care is taken by suitable cooling that the temperature in the stirring mechanism does not exceed 10° C. After finishing the admission of alkali, the amount of reducing substances in the reaction liquid determined by titration with Fehling's solution has fallen to 8 gms. in a hundred compared with the initial amount of 31.3 gms. of aldehydes. Finally, while further controlling the progress of the condensation, the reaction mixture is warmed uniformly to 30 to 35° C. until the minimum obtained by titration of 1.6 to 1.4 is reached.

By rapid cooling to 15° C. further condensation is prevented and the alkalinity of the solution is brought to a pH value of 7.6 by the addition of a few cubic centimetres of 20 per cent sulphuric acid.

The solution is concentrated in vacuum at a temperature below 35° C. up to a content of dried material of approximately 75 per cent and the solid product thus precipitated is separated in the cold by filtering or centrifuging. In this way, a crude product is obtained which contains 96 gms. of pentaerythrite. A further 11 gms. is obtained from the filtrate by a strong concentration in vacuums so that the total yield amounts to 107 gms. equals 78.7 per cent of the theoretical yield.

*Example 2.*—A mixture of 400 gms. of 30 per cent by weight formaldehyde with 44 gms. of acetaldehyde is added to a suspension of 40 gms. of 80 per cent lime in 300 c. c. of water in the course of about two hours, while stirring at 15° C. The temperature of the mixture is then within one hour raised to 30° C., the increase in temperature being kept steady. 5 c. c. of the mixture titrated with Fehling's solution according to Schorl-Lehmann then gave a consumption of 2.6 to 2.8 c. c. of deci-normal iodine solution. If the consumption of iodine is greater corresponding to a higher amount of the reducing substances, the slow heating is continued until the given value is attained, but in the extreme case the heating must be continued to 35° C. Then cooling is rapidly effected to 15° C. and the condensed mixture is left to itself at this temperature for about 16 to 20 hours. The consumption of iodine by the solution falls within this time to the minimum of 1.2 to 1.4 c. c. The lime not consumed then separates out quantitatively; the remaining solution is water-clear and colourless. Its pH value amounts to exactly 7.8. The clear solution is carefully siphoned off, the remainder of the liquid filtered off from the muddy lime and the filtrate together with the solution is concentrated in vacuum at 35° C. A crude product is obtained with 98 gms. of pentaerythrite and by further concentration of the mother liquor a further 12 gms., or a total yield of 110 gms., which is 80.8 per cent of the theoretical yield. The variation in the temperature is shown by curve T, and the decrease in the amount of substances to be reduced plotted against the time is shown by curve M in Figure 2.

Apart from the yield which according to the above examples, with this method of working can be easily brought up to 75 to 80 per cent and, in no experiment, lies below 70 per cent, the quality of the product is particularly striking.

By steam distillation in a vacuum, preferably at a temperature below 35° C. a very clear scarcely colored crude product is obtained which yields a snow white pure product after single recrystallization for the purpose of separating the admixed salts of formic acid. In fact, without further treatment, the pure product is obtained in amounts of about 90 per cent of the pentaerythrite contained in the crude product without working up the mother liquor any further.

This favourable result as regards the quality of the product may be explained easily from the method of working adopted in accordance with the present invention. By interrupting the condensation at the right moment, the formation of complicated condensation products is avoided which normally, as experiments show, are strongly coloured, are soluble in water with difficulty, and owing to their resin-like properties greatly affect the purity of the crude product as well as render extraordinarily difficult, the further purification of it by recrystallization and render necessary the use of activated carbon for decolorizing purposes and in addition, give rise to poorer yields of the pure product; thus, for example only 80 per cent of pure product is obtained from the crude pentaerythrite calculated as free from ash as is obtained by steam distillation. As a matter of fact, with the method of working according to the present invention the reaction does not end with the formation of pentaerythrite, that is to say, apart from small amounts of the initial aldehydes there are in the solution particularly intermediate products of the reaction. The conversion of these small amounts of intermediate products still present in the reaction mixture without any residue and which are colourless and are very easily soluble in water, which can only be actually carried out at high temperatures, is however, attended with great disadvantages as regards the yield and the quality of the end product, in that as a result of a too extensive condensation, the strongly coloured resin-like compounds already mentioned occur and render extraordinarily difficult the working up of the crude product.

It has been found that by means of the good yields obtained in accordance with the invention, the amounts of pentaerythrite to be obtained from the intermediate products mentioned lie throughout considerably below the losses which, on the other hand are partly due to a too extensive condensation which causes the destruction of the pentaerythrite already formed and partly to the adverse affect upon its quality.

It has further been found that the course of the reaction according to the method of working in accordance with the present invention, is facilitated if the alkaline condensation agent such as caustic soda or caustic lime is added in amounts smaller than the stoichiometric amounts, for example in amounts of only 0.85 to 0.90% relating to the theoretical amount according to the above cited chemical equation. In that way the reaction is prevented from passing too rapidly through the point of minimum amount of reducing substances so that the end point of the reaction can be more easily appreciated. Also with the use of caustic soda, in which the alkali not consumed must be rendered ineffective at that moment by the addition of neutralizing agents up to the pH value suitable for the further treatment owing to the small excess of alkali, the alkali may be rendered ineffective much more conveniently and economically. I have found, that suitable pH values for the further treatment of the reaction liquid by steam distillation in vacuum are pH=7 to 8 and particularly a pH value of 7.6 to 7.8. With a use of a deficiency of lime of the stated amount this value of from 7.6 to 7.8 adjusts itself almost automatically upon the removal of the main amount of the suspended lime from the reaction liquid by deposition.

By maintaining the weakly alkaline reaction during the further treatment in all cases the too extensive etherizing of the pentaerythrite with the formation of unallowably large amounts of dipentaerythrite is avoided as well as corresponding reactions between pentaerythrite and by-products from side reactions, for example the formation of acetals with aldehydes or esterification with formic acid.

Further, it has been found that as regards the time of interrupting the reaction, the duration and the conditions of the subsequent treatments should be taken into consideration. For example in spite of cooling the reaction liquid with longer delays to temperatures of 20 to 25° C. in the presence of suspended lime still capable of reaction in the reaction liquid the condensation can be still considerably advanced and in particular any minimum in reducing substances, important for the production of good yields, can be exceeded with the result that the above-mentioned detrimental consequences occur. It is particularly important to take these circumstances into consideration insofar as lime is employed and this lime which has turned out to be extraordinarily suitable separates by allowing the liquid to settle. With this object, the reaction mixture is removed from the reaction vessel at a time at which the minimum amount of materials to be reduced has not been completely reached, since in the settling vessel with a delay of a number of hours even at temperatures of, for example 20° C., the reaction still proceeds perceptibly. The following example on a commercial scale consists of a technical experiment in accordance with this method of working.

Example 3.—A suspension of the 0.8 kgms. of 80 per cent lime in 120 m. of water, while well cooled in a stirring mechanism is mixed a mixture also cooled of 80 kgms. of 30 per cent formaldehyde and 8.8 kgms. of acetaldehyde. The addition of the aldehyde mixture is effected within three hours, while its temperature should never exceed 15° and preferably is maintained as constant as possible between 8 and 10° C. After the complete addition is completed the temperature is increased for an hour for such a time until a sample of the condensate titrated with Fehling's solution indicates a return to 2.5 in content of reducing substances. The heating is then immediately stopped, the mixture cooled to 10 to 15° and allowed to remain in settling vessels at about 15° for about 20 hours. The further control of the reduction value of the solution shows that during this time the content in reducing substances falls to the minimum of 1.5. The hydrogen-ion-concentration of the condensate corresponds to a pH value of 7.6 to 7.8.

The colourless solution is concentrated together with the filtrate of lime suspension in a vacuum of 35° C. up to a content of dried material of 70 per cent. As a result 24.65 kgms. of crude product with a content of 19.0 kgms of pentaerythrite separates out. By further concentration of the mother liquor, 4.0 kgms. of crude product is obtained corresponding to a further 2.4 kgms. of pure pentaerythrite. The total yield of crude product accordingly amounts to 78.8 per cent of the theoretical yield.

In order to purify the crude product, it is distilled the pH value of this solution is brought to the value 6 by the addition of 400 c. c. of 20 per cent whereupon the major part of the impurities (mainly calcium formate) is separated as the filtration residue. Upon cooling the almost colourless filtrate yields a beautiful crystalline ash-free pure product in an amount of 19.6 kgms. which is equal to 72.3 per cent of the theoretical yield.

Owing to the weakly acid reaction of the solution, the separation of the calcium formate is substantially facilitated during the recrystallization. At the same time, in this way, a definite lightening of the colour of the mother liquor takes place with the result that the quality of the crystalline pure product is considerably improved. In order to shorten the time of settling of the lime suspension, it has been found to be very advantageous to introduce into the reaction mixture, before it is transferred into the settling vessel, small amounts of certain additions and barium compounds such as barium sulphate or barium hydrate having been found to be particularly suitable for this purpose.

The extraordinary value of the method above described in which the amount of reducing substances is continuously controlled, is particularly shown in carrying out this process in a continuous manner. This will be made clear from the Figure 4 according to which for example, a mixture of one mol. of acetaldehyde and four mols. of formaldehyde, coming from the vessel $A^1$ and a suspension of 0.44 mols. of lime coming from the vessel $A^2$ are introduced at A into a horizontal reaction vessel.

There the components are brought into reaction by gradual movement from A to B with suitable regulation of the temperature and the reaction mixture is finally drawn off at B as a liquid to be worked up for the preparation of the pentaerythrite. The regulation of temperature in this treatment is preferably effected by surrounding the reaction vessel along its whole length alternately with cooling jackets E. Provision is made at the same time for an intensive mixing of the reaction liquid and for a uniform heat distribution by means of a horizontal stirring mechanism F. The liquid leaving the condensation apparatus at B may flow direct into settling vessels $G^1$ and $G^2$, in which the separation of the suspension of lime and the final condensation up to the point of the minimum amount of reducing substances is attained as is explained in Example 3, takes place.

On this continuous method of working it is particularly important to be able to ascertain the progress of the condensation at any time in the different zones of the reaction vessel. For this purpose, samples corresponding with the liquid contained in the different zones of the apparatus are regularly taken off from the test pipes C and are titrated with Fehling's solution in the manner described above. In accordance with the reduction value thus ascertained, it is then possible to accelerate or slow down the course of the reaction, for example by altering the speed of passing through or increasing or reducing the temperature and accordingly to bring the shape of the curve representing the amount of the reducing substances as nearly as desired to the ideal case. In Figure 4 the course of the reduction value during the passage of the liquid through such a continuously working apparatus is shown plotted against time in the curve M. The curve T again shows the variation in temperature throughout the reaction. The points A and B and the distances $D^1$, E and $D^2$ represent the times at which a given portion of the reaction liquid passes the corresponding parts as shown in Figure 3.

What I claim is:

1. A process for the production of pentaerythrite, comprising condensing formaldehyde with acetaldehyde in aqueous solution in the presence of an alkaline condensing agent, and interrupting the condensation not later than at a point ranging from several hours to several days after the start of the process, at which there is a minimum amount of reducing substances, and before the amount of reducing substances begins increasing anew due to the reaction, this minimum being determined by titration with Fehling's solution.

2. A process for the production of pentaerythrite, comprising condensing formaldehyde with acetaldehyde in aqueous solution in the presence of an alkaline condensing agent, and interrupting the condensation before the point ranging from several hours to several days after the start of the process, at which there is a minimum amount of reducing substances, and before the amount of reducing substances begins increasing anew due to the reaction, this minimum being determined by titration with Fehling's solution.

3. A process for the production of pentaerythrite, comprising condensing formaldehyde with acetaldehyde in aqueous solution in the presence of an alkaline condensing agent, and interrupting the condensation at a point ranging from several hours to several days after the start of the process, at which there is a minimum amount of reducing substances, and before the amount of reducing substances begins increasing anew due to the reaction, this minimum being determined by titration with Fehling's solution.

4. A process for the production of pentaerythrite, comprising condensing formaldehyde with acetaldehyde in aqueous solution in the presence of an alkaline condensing agent, using smaller amounts of a condensing agent than the stoichiometrically calculated amount and interrupting the condensation not later than at a point ranging from several hours to several days after the start of the process, at which there is a minimum amount of reducing substances, and before the amount of reducing substances begins increasing anew due to the reaction, this minimum being determined by titration with Fehling's solution.

5. A process for the production of pentaerythrite, comprising condensing formaldehyde with acetaldehyde in aqueous solution in the presence of an alkaline condensing agent, and interrupting the condensation by removing the unconverted condensation agent not later than at a point ranging from several hours to several days after the start of the process, at which there is a minimum amount of reducing substances, and before the amount of reducing substances begins increasing anew due to the reaction, this minimum being determined by titration with Fehling's solution.

6. A process for the production of pentaerythrite, comprising condensing formaldehyde with acetaldehyde in aqueous solution in the presence of an alkaline condensing agent, and interrupting the condensation by neutralizing the unconverted condensing agent not later than at a point ranging from several hours to several days after the start of the process, at which there is a minimum amount of reducing substances, and before the amount of reducing substances begins increasing anew due to the reaction, this minimum being determined by titration with Fehling's solution.

7. A process for the production of pentaerythrite, comprising condensing formaldehyde with acetaldehyde in aqueous solution in the presence of an alkaline condensing agent, and interrupting the condensation by cooling the reaction mixture not later than at a point ranging from several hours to several days after the start of the process, at which there is a minimum amount of reducing substances, and before the amount of reducing substances begins increasing anew due to the reaction, this minimum being determined by titration with Fehling's solution.

8. A process for the production of pentaerythrite, comprising condensing formaldehyde with acetaldehyde in the molecular ratio 4:1 in aqueous solution by means of 85 to 90% of the stoichiometrically calculated amount of quicklime, and removing the unconverted quicklime by settling before reaching, after an interval ranging from several hours to several days after the start of the process, the point at which there is the minimum amount of reducing substances, and before the amount of reducing substances begins increasing anew due to the reaction, this point being determined by titration with Fehling's solution.

9. A process for the production of pentaerythrite, comprising condensing formaldehyde with acetaldehyde in aqueous solution in the presence of an alkaline condensing agent, interrupting the condensation not later than at a point ranging from several hours to several days after the start of the process, at which there is a minimum amount of reducing substances, and before the amount of reducing substances begins increasing anew due to the reaction, such minimum being determined by analytic tests.

10. A process for the production of pentaerythrite comprising condensing formaldehyde with acetaldehyde in aqueous solution in the presence of an alkaline condensing agent, interrupting the condensation before the point ranging from several hours to several days after the start of the process, at which there is a minimum amount of reducing substances, and before the amount of reducing substances begins increasing anew due to the reaction, such minimum amount being determined by analytic tests.

11. A process for the production of pentaerythrite comprising condensing formaldehyde with acetaldehyde in aqueous solution in the presence of an alkaline condensing agent, interrupting the condensation at a point ranging from several hours to several days after the start of the process, at which there is a minimum amount of reducing substances, and before the amount of reducing substances begins increasing anew due to the reaction, such minimum amount being determined by analytic tests.

12. A process for the production of pentaerythrite comprising condensing formaldehyde with acetaldehyde in aqueous solution in the presence of an alkaline condensing agent, such condensing agent being in smaller amounts than the stoichiometrically calculated amount and interrupting the condensation before a point ranging from several hours to several days after the start of the process, at which there is a minimum amount of reducing substances, and before the amount of reducing substances begins increasing anew due to the reaction, such minimum amount being determined by analytic tests.

13. A process for the production of pentaerythrite comprising condensing formaldehyde with acetaldehyde in aqueous solution in the presence of an alkaline condensing agent, interrupting the condensation by removing the unconverted condensation agent before a point ranging from several hours to several days after the start of the process, at which there is a minimum amount of reducing substances, and before the amount of reducing substances begins increasing anew due to the reaction, such minimum amount being determined by analytic tests.

14. A process for the production of pentaerythrite comprising condensing formaldehyde with acetaldehyde in aqueous solution in the presence of an alkaline condensing agent, interrupting the condensation of neutralizing the unconverted condensing agent before a point ranging from several hours to several days after the start of the process, at which there is a minimum amount of reducing substances, and before the amount of reducing substances begins increasing anew due to the reaction, such minimum amount being determined by analytic tests.

15. A process for the production of pentaerythrite comprising condensing formaldehyde with acetaldehyde in aqueous solution in temperatures not exceeding 35° C. in the presence of an alkaline condensing agent, such condensing agent being used in smaller amounts than the stoichiometrically calculated amount, interrupting the condensation before a point ranging from several hours to several days after the start of the process, at which there is a minimum amount of reducing substances, and before the amount of reducing substances begins increasing anew due to the reaction, such minimum amount being determined by titration with Fehling's solution and said minimum amount being slowly approached by said steps delaying the reaction.

16. A process for the production of pentaerythrite, comprising condensing formaldehyde with acetaldehyde in the molecular ratio of 4:1 in aqueous solution by means of 0.85 to 0.90% of the stoichiometrically calculated amount of an alkaline condensing agent, interrupting the condensation before a point ranging from several hours to several days after the start of the process, at which there is a minimum amount of reducing substances, and before the amount of reducing substances begins increasing anew due to the reaction, such minimum amount being determined by titration with Fehling's solution and delaying the reaction so as to approach said minimum amount slowly.

ERICH NAUJOKS.